Dec. 8, 1936. A. L. DE LEEUW 2,063,492
TOOL FOR AND METHOD OF PRODUCING GEARS
Filed Feb. 13, 1935 2 Sheets-Sheet 1

Inventor
Adolph L. DeLeeuw
By
R. M. Schlesinger
his Attorney

Dec. 8, 1936.   A. L. DE LEEUW   2,063,492
TOOL FOR AND METHOD OF PRODUCING GEARS
Filed Feb. 13, 1935   2 Sheets-Sheet 2
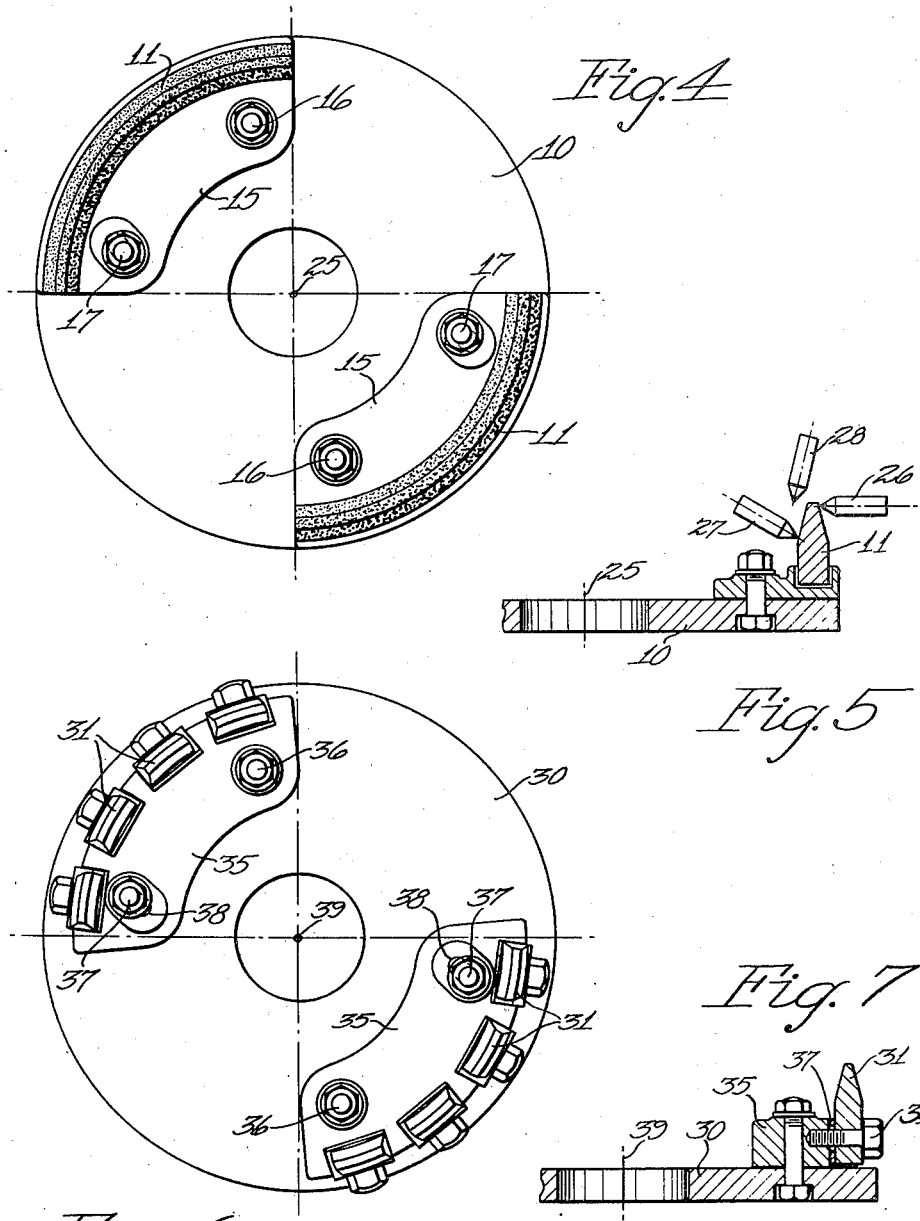

Patented Dec. 8, 1936

2,063,492

UNITED STATES PATENT OFFICE 2,063,492

TOOL FOR AND METHOD OF PRODUCING GEARS

Adolph L. De Leeuw, Plainfield, N. J., assignor to Gleason Works, Rochester, N. Y., a corporation of New York Application February 13, 1935, Serial No. 6,325

11 Claims. (Cl. 51—278)

The present invention relates to a method and apparatus for producing articles having longitudinally curved teeth and more especially to a method and apparatus for producing longitudinally curved tooth gears.

In one aspect, it is an object of this invention to provide a simplified form of tool for grinding longitudinally curved tooth gears in a continuous indexing process, and a tool which at the same time can be very easily dressed to maintain its accuracy.

In another aspect, it is an object of this invention to provide an improved form of face-mill cutting tool of the type in which the cutting blades are so arranged in gangs that the different gangs enter successively different tooth spaces of the blank as the tool and the blank rotate together, in which the gangs and blades can very easily be trued up or sharpened.

Other objects of the invention will be apparent hereinafter from the specification and from the recital of the appended claims.

In the drawings:

Fig. 4 is a side elevation and Fig. 5 a fragmentary sectional view, corresponding to Figs. 1 and 2, respectively, and showing how the segments of the grinding wheel are adjusted in order to dress the wheel; and Fig. 6 is a side elevation and Fig. 7 a fragmentary sectional view of a face-mill hob constructed according to this invention.

Figure 1:
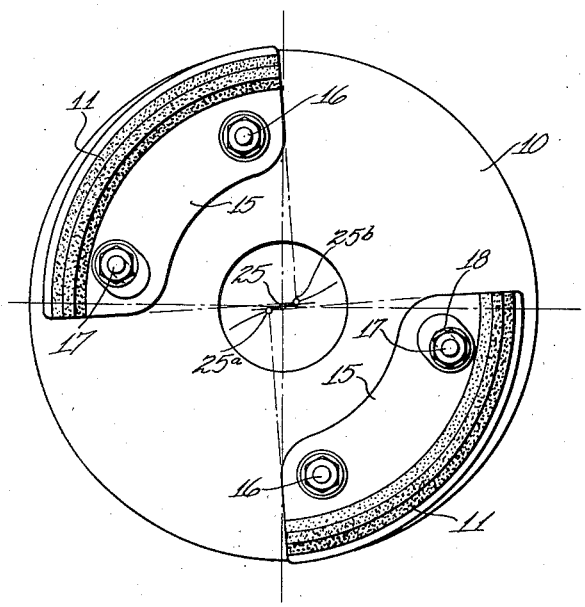
Fig. 1 is a side elevation and Fig. 2 a fragmentary sectional view of a segmental grinding wheel constructed according to one form of this invention.
Figure 2:
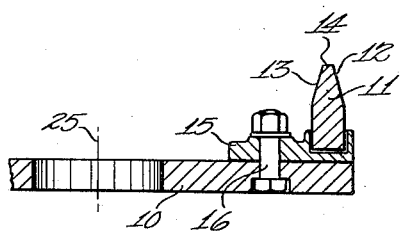

In the grinding of a work-piece according to this invention a segmental grinding wheel is employed. This grinding wheel has preferably a plurality of grinding segments which are identical with one another and which are equally spaced around the periphery of the wheel and arranged so that the different segments enter successively different tooth spaces of the work-piece as the wheel rotates in timed relation with the moving work-piece. In order to provide the necessary clearance between the sides of the segments and the surfaces to be ground on the work-piece, as the wheel rotates in timed relation with the work-piece, the segments are inclined to the circumference of the wheel. In the preferred construction, however, the segments are mounted adjustably on the wheel-head so that they can not only be inclined at any desired angle to the circumference of the head to provide the required clearance, but may also be adjusted, for dressing, so as to be coaxial of the head. This latter is a very important feature of the present invention. It permits of dressing the segments by simply rotating the grinding wheel past a suitable dressing tool. No complicated dressing motions are required, for the segments are simply dressed as surfaces of revolution coaxial with the head and are then re-adjusted to the required inclination with reference to the circumference of the wheel to give them grinding clearance.

Cutting tools made according to the present invention are preferably similar in construction to the grinding wheels. Instead of grinding segments, cutting blades are employed and these blades are arranged in gangs and the separate gangs are equally spaced around the circumference of the tool head. Each gang of blades is inclined to the circumference of the head so that all of the blades of a gang may have the required clearance in cutting a tooth space of the work but each gang of blades is preferably mounted upon the wheel head so as to be adjustable also to a position where the blades are coaxial of the head. In this latter position the blades can be very easily trued or sharpened. The present invention, therefore, provides a very simple but practical form of tool for either grinding or cutting in a continuous indexing process.

Reference will now be had to the drawings for a more particular description of the invention. In Figs. 1 to 5, inclusive, 10 designates a rotary grinding wheel head and 11 the grinding segments. In the embodiment illustrated, there are two grinding segments mounted on the wheel head. These grinding segments are arcuate in shape from front to rear and extend through an angle of 90°. In cross section, the segments 11 have the form of a rack-tooth having straight sides 12 and 13 which converge toward the tips 14 of the segments.

Each segment is suitably secured in a holding or carrier-plate 15. The holding-plates 15 are mounted in diametrically opposed relation upon the rotary head 10, each plate being secured to the head 10 by bolts 16 and 17 and cooperating nuts. The bolts 16 form pivots for these plates 15 in their angular adjustment upon the head 10 and the bolts 17 serve, in conjunction with the bolts 16, to hold the plates in any position of their adjustment. The bolts 17 pass through arcuate slots 18 in the plates 16, which are concentric with the pivot bolts 16.

The different segments 11 are intended to enter successively different tooth slots of the work as the grinding wheel rotates in engagement with the work. Therefore, the plates 15 are adjusted on the head 10 so that the segments 11 are inclined to the circumference of the plate at the angle required to provide the necessary grinding clearance between the sides of the segments and the sides of the tooth slots during passage of the segments through the tooth slots. An operative position of the segments is shown in Fig. 1.

Figure 3:
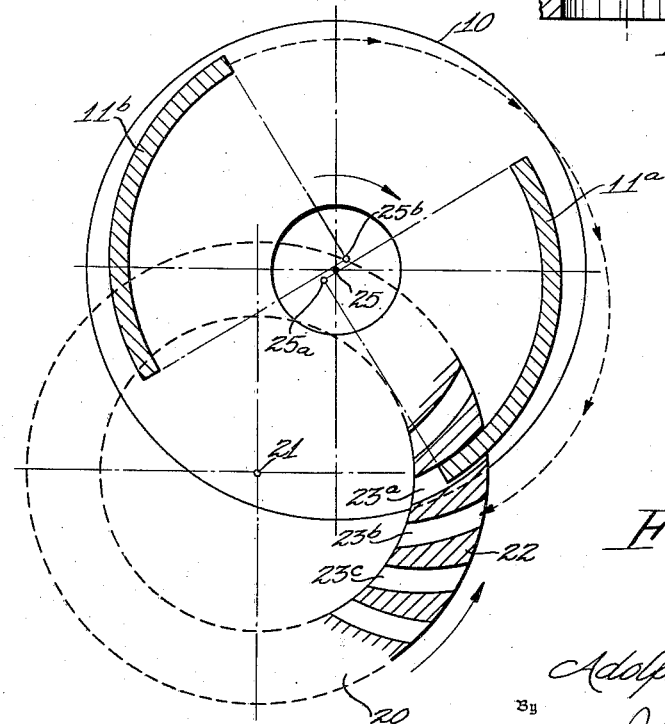
Fig. 3 is a diagrammatic view showing the relative positions of this segmental grinding wheel and a longitudinally curved tooth bevel gear in the grinding of such a gear.

The operation of grinding a spiral bevel gear by the present invention is illustrated diagrammatically in Fig. 3. The gear to be ground is designated at 20. Its axis is at 21 and it has longitudinally curved teeth 22. The grinding wheel is brought into engagement with the gear and the grinding wheel and the gear are rotated on their respective axes 25 and 21 in such timed relation that the different segments 11 of the grinding wheel enter successively different tooth spaces of the gear to grind the sides thereof, as the wheel and the gear rotate together. Thus the segment designated 11a grinds a side of the tooth space 23a and then, the segment 11b enters and grinds a side of the tooth space 23b, and then the segment 11a enters and grinds a side of the tooth space 23c etc., the wheel and the gear rotating all the while in timed relation in the direction indicated by the arrows in Fig. 3. The rotation of the gear in the periods between engagement with the gear of the successive segments indexes the gear and no complicated indexing mechanism is required. Better tooth spacing is theoretically possible, also, because wear of the wheel is spread over all of the tooth surfaces of the gear, all being operated upon simultaneously.

To dress the segments 11, the plates 15 are adjusted on the head 10 so that the side surfaces of the segments are coaxial of the axis 25 of the grinding wheel head. The segments are shown adjusted into dressing position in Fig. 4. To dress the segments, diamonds 26, 27 and 28 may be employed. The diamonds 26 and 27 are arranged to dress the sides 12 and 13, respectively, of the segments while the diamond 28 is arranged to dress the tips of the segments. In the dressing operation, the head 10 is simply rotated on its axis 25 to carry the segments 11 under the dressing tools and the dressing tools are either reciprocated or slowly fed across the surfaces which they are to dress.

As a result of this preferred method of dressing, the side surfaces of the segments are dressed as surfaces of revolution coaxial of the axis of the head 25. Where the side dressers 26 and 27 are inclined to the axis 25 of the wheel, as shown in Fig. 5, the side surfaces of the segments will be conical surfaces of revolution coaxial of the head. When the segments are adjusted on the head back to operative position, the axes 25a and 25b of these conical surfaces of revolution are offset from the axis 25 of the head 10 as shown clearly in Figs. 1 and 3.

Preferably only one side of the teeth are ground at a time with a tool constructed according to the present invention and after one side of all the teeth have been ground the tool and gear are readjusted to grind the other side of the teeth.

In cutting gears according to the present invention, a cutting tool may be employed such as shown in Figs. 6 and 7. This tool comprises a rotary head 30 and a plurality of cutting blades 31. Each of the cutting blades is preferably curved from front to rear and relieved to provide cutting clearance.

The cutting blades are assembled in gangs. In Fig. 6, I have shown four blades to a gang, though, of course, the number of blades in a gang is optional. The individual blades of each gang are secured to a holder-plate 35 by bolts 34. A shim 37 may be interposed between the inside of each blade and the opposed wall of the slot in the plate 35 in which the blade is mounted so as to permit radial adjustment of the blade on the carrier plate 35. The carrier plates 35 are secured to the head 30 by bolts 36 and 37. Each bolt 36 serves as a pivot around which a carrier plate may be adjusted angularly on the head 30 and each bolt 37 engages in an arcuate slot 38 that is concentric with the bolt 36. Thus, the carrier plates 35 may be adjusted on the head 30 in a manner similar to that in which the carrier plates 15 are adjusted on the grinding wheel head 10.

By adjustment of the carrier plates 35 on the head 30, the gangs of blades may be inclined to the circumference of the head 30 so that all the blades of a gang can pass through the same tooth slot of a gear blank as the head rotates in engagement with the blank. This mounting permits, also, of adjusting the blades so that each gang will be coaxial of the axis 39 of the cutter head. In this latter position of adjustment, the blades can be trued so that their cutting edges will lie in the same surface of revolution and this latter position of adjustment permits, also, of sharpening the blades on present sharpening apparatus.

The cutter shown in Figs. 6 and 7 is used in a manner similar to the grinding wheel already described. It is rotated in such timed relation with a rotating gear blank that the different gangs of blades enter successively different tooth slots of the blank.

While the invention has been described in connection with the production of a particular kind of gear, it will be understood that it is applicable to the production of other kinds of gears also and either in a generating or a forming process. Moreover, in general it is applicable to the production of various other forms of toothed elements. The present application is intended to cover any variations, uses or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A gear grinding tool comprising a rotary head and a plurality of grinding segments which project from one side face of the head in the general direction of the axis of the head and are inclined to the circumference of the head and arranged on the head in spaced relation for successive engagement with different surfaces of the work, said segments having their side surfaces as active grinding surfaces.

2. A gear grinding tool comprising a rotary head and a plurality of grinding segments which project from one side face of the head in the general direction of the axis of the head and are inclined to the circumference of the head and have converging side surfaces of rack tooth shape and are arranged on the head in spaced relation for successive engagement with different tooth surfaces of a gear as the tool and gear rotate together.

3. A grinding tool comprising a rotary head and a plurality of grinding segments which project from one side face of the head in the general direction of the axis of the head and are arranged on the head in spaced relation for successive engagement with different surfaces of the work and have active side surfaces formed as surfaces of revolution whose axes are offset from the axis of the head.

4. A grinding tool comprising a rotary head and a plurality of grinding segments which project from one side face of the head in the general direction of the axis of the head and are arranged for successive engagement with different surfaces of the work and have active side surfaces of conical shape, the axes of which are offset from the axis of the head.

5. A grinding tool comprising a rotary head and a plurality of grinding segments which project from one side face of the head in the general direction of the head, each of said segments being adjustably mounted on the head so that its side surfaces may either be inclined to the circumference of the head for operation or adjusted to be coaxial of the head for dressing.

6. A grinding tool comprising a rotary head and a plurality of grinding segments which have conical side surfaces projecting from one side face of the head, each of said segments being adjustably mounted on the head to incline a conical side surface to the circumference of the head or to adjust said surface to be coaxial of the head.

7. The method of grinding gears which comprises rotating a tool, which has a plurality of spaced grinding segments, in engagement with a continuously rotating gear so that successive segments grind successively different tooth surfaces of the gear.

8. A grinding tool for grinding tooth surfaces of gears comprising a rotary head and a segment secured thereto to project beyond one side face of the head in the general direction of the axis of the head, said segment having an active side surface for grinding the tooth surfaces which is a surface of revolution whose axis is offset from but parallel to the axis of the head.

9. A grinding tool for grinding tooth surfaces of gears comprising a rotary head and a segment secured thereto to project beyond one side face of the head in the general direction of the axis of the head, said segment having an active grinding surface at one side for grinding the tooth surfaces of the gear which is a conical surface of revolution whose axis is offset from but parallel to the axis of the head.

10. A grinding tool comprising a rotary head and a plurality of spaced grinding segments, each of said segments being curved from front to back and mounted on the head so that the back of the segment is offset with reference to the front thereof to afford clearance in passing through a tooth space of a member to be ground.

11. A tool for producing gears comprising a rotary head and operating members arranged in spaced relation for successive engagement with successive tooth spaces of a gear, said operating members having operating surfaces projecting from the head in the general direction of the axis of the head and said operating members being independently adjustable on the head so that the operating surfaces of said members may either be inclined to the periphery of the head or arranged coaxial thereof.

ADOLPH L. DE LEEUW.